(12) United States Patent
Wang (10) Patent No.: US 10,686,507 B2
(45) Date of Patent: Jun. 16, 2020

(54) METHOD AND DEVICE FOR BEAMFORMING

(71) Applicant: DATANG MOBIILE COMMUNICATIONS EQUIPMENT CO., LTD., Beijing (CN)

(72) Inventor: Ling Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/340,684

(22) PCT Filed: Aug. 21, 2017

(86) PCT No.: PCT/CN2017/098308
§ 371 (c)(1),
(2) Date: Apr. 9, 2019

(87) PCT Pub. No.: WO2018/046920
PCT Pub. Date: Apr. 12, 2018

(65) Prior Publication Data
US 2019/0296813 A1    Sep. 26, 2019

(30) Foreign Application Priority Data
Oct. 9, 2016 (CN) .......................... 2016 1 0881732

(51) Int. Cl.
*H04B 7/06* (2006.01)
*H04W 16/28* (2009.01)
(Continued)

(52) U.S. Cl.
CPC ......... *H04B 7/0617* (2013.01); *H04B 7/0482* (2013.01); *H04B 7/06* (2013.01);
(Continued)

(58) Field of Classification Search
CPC ...... H04B 7/0617; H04B 7/0413; H04B 7/06; H04B 7/0897; H04B 7/0482;
(Continued)

(56) References Cited

U.S. PATENT DOCUMENTS

| 5,852,630 A | * | 12/1998 | Langberg | ............ | H04L 27/2647 375/219 |
| 6,232,918 B1 | * | 5/2001 | Wax | ........................ | G01C 21/26 342/360 |

(Continued)

FOREIGN PATENT DOCUMENTS

| CN | 103975619 A | 8/2014 |
| CN | 104779986 A | 7/2015 |

(Continued)

OTHER PUBLICATIONS

International Search Report of the International Searching Authority for International Application No. PCT/CN2017/098308, dated Nov. 3, 2017, 6 pages.

(Continued)

*Primary Examiner* — Siu M Lee
(74) *Attorney, Agent, or Firm* — Womble Bond Dickinson (US) LLP (57) ABSTRACT

Disclosed are a method and device for beamforming, for use in performing beamforming by means of combining location information of a user equipment, thus ensuring improved broadcast beam coverage performance, and preventing the problem of large power loss resulting from an insufficient broadcasting beamforming weight amplitude value being employed to ensure all coverage ranges in a cell. Provided in the present application, the method for beamforming comprises: determining location information of a user equipment, and performing beamforming on the basis of the location information of the user equipment.

7 Claims, 3 Drawing Sheets

(51) Int. Cl.
*H04W 64/00* (2009.01)
*H04B 7/0456* (2017.01)
*H04B 7/08* (2006.01)
*H04L 25/02* (2006.01)
*H04B 7/0413* (2017.01)
*H04L 5/00* (2006.01)

(52) U.S. Cl.
CPC ....... *H04B 7/0897* (2013.01); *H04L 25/0228* (2013.01); *H04W 16/28* (2013.01); *H04W 64/003* (2013.01); *H04B 7/0413* (2013.01); *H04L 5/005* (2013.01); *Y02D 70/00* (2018.01)

(58) Field of Classification Search
CPC .... H04W 16/28; H04W 64/003; H04L 5/005; H04L 25/0228; Y02D 70/00
See application file for complete search history.

(56) References Cited

U.S. PATENT DOCUMENTS

| | | | | |
|---|---|---|---|---|
| 10,299,275 B2* | 5/2019 | Hou | ..................... | H04B 7/0695 |
| 2013/0059620 A1 | 3/2013 | Cho | | |
| 2013/0235807 A1 | 9/2013 | Lee et al. | | |
| 2015/0016379 A1* | 1/2015 | Nam | ..................... | H04B 7/0456 370/329 |
| 2017/0135085 A1* | 5/2017 | Kaushik | ............... | H04B 7/0417 |
| 2017/0214442 A1* | 7/2017 | Chae | ................. | H04W 72/0446 |
| 2019/0037548 A1* | 1/2019 | Costa | ................... | H04B 7/0452 |

FOREIGN PATENT DOCUMENTS

| | | |
|---|---|---|
| CN | 105099534 A | 11/2015 |
| CN | 105634578 A | 6/2016 |
| CN | 105850055 A | 8/2016 |
| WO | 0156317 A1 | 8/2001 |

OTHER PUBLICATIONS

The Extended European Search Report for Application No. EP17857801.9 dated Jul. 31, 2019, 9 pages.

* cited by examiner

UEs in a cluster 1 are scheduled,
and a broadcast beam points to the
center of an angle range of the UEs UEs in a cluster 2 are scheduled

METHOD AND DEVICE FOR BEAMFORMING

CROSS REFERENCE TO RELATED APPLICATIONS

This patent application is a U.S. National Stage of International Application No. PCT/CN2017/098308, filed Aug. 21, 2017, which claims priority to Chinese Patent Application No. 201610881732.5, filed with the Chinese Patent Office on Oct. 9, 2016, and entitled "Beam-forming method and apparatus", which was incorporated by reference in its entirety.

FIELD

The present invention relates to the field of communications, and particularly to a beam-forming method and apparatus.

BACKGROUND

Massive Multiple-Input Multiple-Output (MIMO) is one of important characteristics in Time-Division Long-Term Evolution (TD-LTE) technical evolution (4.5G), and characterized in flexible network deployment, easiness to select a site, enhanced coverage, lower interference, and an extended capacity.

Figure 1:
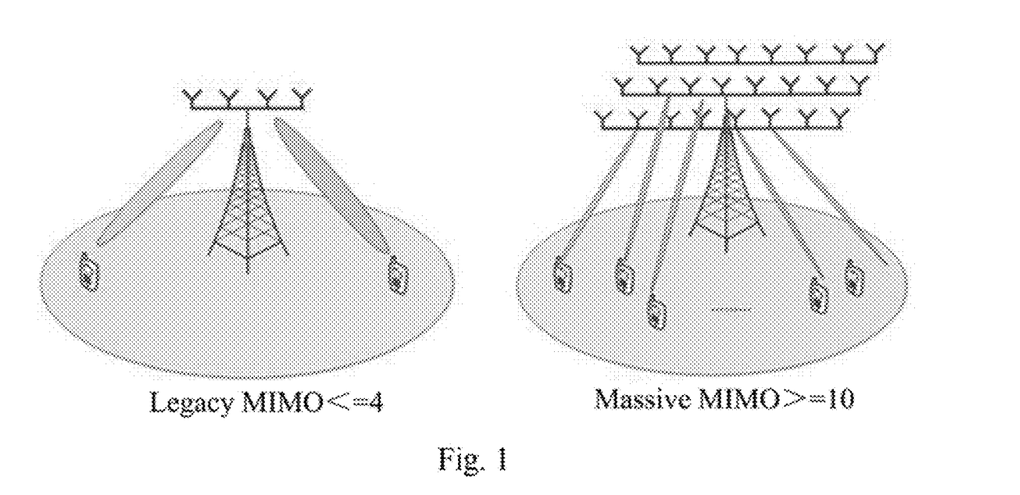
FIG. 1 is a schematic diagram of performance comparison between massive MIMO and legacy MIMO in the prior art in terms of the number of accessing UEs.

With massive MIMO, the average spectrum efficiency of a cell is improved by installing hundreds of antennas (e.g., 128 or more antennas) in a base station As illustrated in FIG. 1, when there are more and more antennas of the base station, channels of UEs are increasingly orthogonal to each other, interference between the UEs are disappearing, and the signal to noise ratio of each UE is improved effectively due to a significant array gain, thus supporting data transmission by more UEs on the same time-frequency resources, and improving the average spectrum efficiency of the cell.

On the other hand, another advantage of 3D-MIMO over legacy antennas is that MIMO in the horizontal and vertical directions is realizable with a two-dimension array of antennas.

Figure 2:
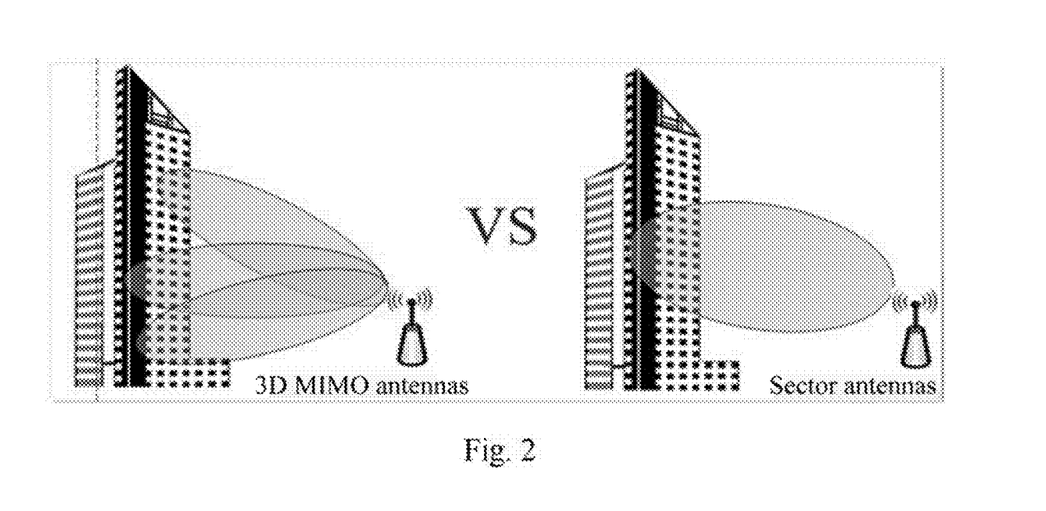
FIG. 2 is a schematic diagram of coverage comparison between massive MIMO and legacy MIMO in the prior art.

In legacy MIMO, there are typically fixed weighting phases for respective dipoles in the vertical direction of respective antenna elements, and thus fixed downward-inclination angles, and respective antenna elements in the horizontal direction are weighted dynamically for dynamic MIMO in the horizontal direction, thus resulting in 2D MIMO. When different dipoles or antenna elements in the horizontal and vertical directions throughout the array of antennas are weighted in phase and amplitude dynamically and controllably, then MIMO in both the horizontal direction and the vertical direction (3D MIMO) is realizable, thus further improving the number of available spatial dimensions of MIMO, so as to improve the spectrum efficiency of a wireless communication system in a space with one more dimension as illustrated in FIG. 2.

With massive MIMO, a weight of broadcast beam-forming can be adjusted dynamically according to the locations of UEs, and of course, this can only be applicable to a Physical Downlink Shared Channel (PDSCH) demodulated using a UE-specific Reference Signal (URS), and for a Physical Downlink Control Channel (PDCCH), a Physical Control Format Indicator Channel (PCFICH), a Physical Downlink Shared Channel (PDSCH), etc., demodulated using a Common Reference Signal (CRS), since the CRS is a cell-level parameter, in order to apply to all the UEs in the coverage area of the cell, the weight of broadcast beam-forming can not be designed for some UE, but the directivity and the coverage area of a broadcast beam shall apply to all the UEs in the cell.

Figure 3:
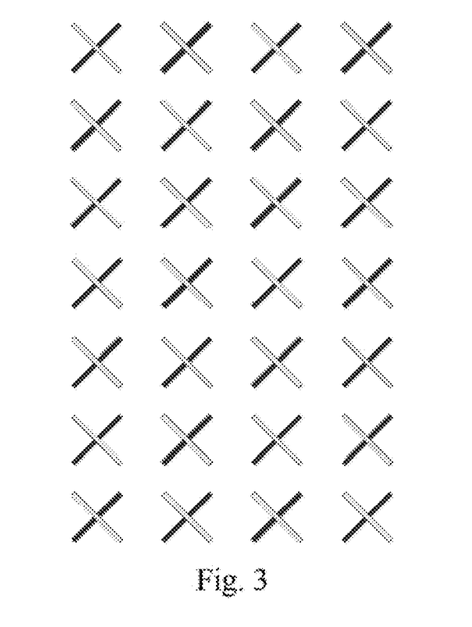
FIG. 3 is a schematic diagram of the distribution of 64 antennas in the prior art.

Taking 64 antennas as an example, in order to guarantee a coverage of 65 degrees in the horizontal and vertical directions, weights of broadcast beam-forming of antennas available from some antenna manufactures are as follows: amplitudes of respective antennas in the vertical direction at 445 degrees are [0.45, 1, 0.9, 0.4, 0.4, 0.9, 1, 0.45], and their phases are 10, 90, 165, −120, −190, 175, 90, −101; and amplitudes of respective antennas in the horizontal direction are [0.35, 0.65, 1, 1, 0.35, 0.65, 1, 1], and their phases are [0, −172, 2, 12, 0, −172, 2, 12], where weights of broadcast beam-forming at −45 degrees are the same as those at +45 degrees. As illustrated in FIG. 3, an antenna in a darker color represents an antenna in the polarization direction of +45 degrees, and an antenna in a lighter color represents an antenna in the polarization direction of −45 degrees.

From the Kronecker products of the weights of broadcast beam-forming in the horizontal and vertical directions, amplitudes of a first column of eight antennas in the vertical direction are [0.1575, 0.35, 0.315, 0.14, 0.315, 0.35, 0.1575], amplitudes of a second column of eight antennas are [0.2925, 0.65, 0.585, 0.26, 0.26, 0.585, 0.65, 0.2925], amplitudes of a third column of eight antennas are [0.45, 1, 0.9, 0.4, 0.4, 0.9, 1, 0.45], and amplitudes of a fourth column of eight antennas are [0.45, 1, 0.9, 0.4, 0.4, 0.9, 1, 0.45]. As can be apparent from the amplitudes of these weighted antennas, many of them are far below 1, and there is such a serious loss of power that the performance of the channels demodulated using a CRS will be degraded seriously.

In summary, only the preconfigured weights of broadcast beam-forming is used to cover the entire coverage area of the cell in the prior art, thus in order to enable the broadcast beam to cover all the locations in the coverage area of the cell, there is such an inevitable loss of energy of the broadcast beam, and the loss may become significant as the number of antennas is increasing.

SUMMARY

Embodiments of the invention provide a beam-forming method and apparatus, to perform beam-forming according to location information of UEs, so as to guarantee high coverage performance of a broadcast beam, and to avoid a significant loss of power arising from a too low amplitude of weight of broadcast beam-forming, which covers the entire coverage area of a cell.

An embodiment of the invention provides a beam-forming method including:

determining location information of a plurality of UEs; and performing beam-forming according to the location information of the UEs.

With this method, the location information of the UEs is determined, and beam-forming is performed according to the location information of the UEs, so that high coverage performance of a broadcast beam can be guaranteed to thereby avoid a significant loss of power arising from a too low amplitude of weight of broadcast beam-forming covering the entire coverage area of a cell.

Optionally before the location information of the UEs is determined, the method further includes:

selecting an initial broadcast beam so that the UEs access a network using the initial broadcast beam.

Optionally the determining the location information of UEs includes:

making a statistics of Angles of Arrival (AOA) in the horizontal direction, and Elevations of Arrival (EOA) of the UEs according to a Sounding Reference Signal (SRS).

Optionally performing beam-forming according to the location information of the UEs includes:

determining beam-forming factors in the horizontal direction of the broadcast beam according to the AOA of the UEs;

determining beam-forming factors in the vertical direction of the broadcast beam according to the EOA of the UEs; and determining weights of broadcast beam-forming according to the beam-forming factors in the horizontal direction, and the beam-forming factors in the vertical direction.

Optionally the method further includes:

clustering the plurality of UEs; and scheduling the UEs in a same cluster using a same weight of broadcast beam-forming.

Optionally the UEs in different clusters are scheduled in a time-division mode using the same weight of broadcast beam-forming at a preset periodicity.

An embodiment of the invention provides a beam-forming apparatus including:

a first unit configured to determine location information of a plurality of UEs; and a second unit configured to perform beam-forming according to the location information of the UEs.

Optionally the first unit is further configured to select an initial broadcast beam so that the UEs access a network using the initial broadcast beam, before the location information of the UEs is determined.

Optionally the first unit is configured:

to make a statistics of Angles of Arrival (AOA) in the horizontal direction, and Elevations of Arrival (EOA) of the UEs according to a Sounding Reference Signal (SRS).

Optionally the second unit is configured:

to determine beam-forming factors in the horizontal direction of the broadcast beam according to the AOA of the UEs;

to determine beam-forming factors in the vertical direction of the broadcast beam according to the EOA of the UEs; and to determine weights of broadcast beam-forming according to the beam-forming factors in the horizontal direction, and the beam-forming factors in the vertical direction.

Optionally the second unit is further configured:

to cluster the plurality of UEs; and to schedule the UEs in a same cluster using a same weight of broadcast beam-forming.

Optionally the second unit is configured to schedule the UEs in different clusters in a time-division mode using the same weight of broadcast beam-forming at a preset periodicity.

An embodiment of the invention provides another beam-forming apparatus including: a processor and a memory, wherein the processor is configured to read and execute program in the memory to perform the method according to any one of the embodiments above of the invention.

An embodiment of the invention provides a computer storage medium storing computer executable instructions configured to cause the computer to perform the method according to any one of the embodiments above of the invention.

BRIEF DESCRIPTION OF THE DRAWINGS

In order to make the technical solutions of the embodiments of the invention more apparent, the drawings to which reference is to be made in the description of the embodiments will be introduced below in brief, and apparently the embodiments to be described below are only some embodiments of the invention. Those ordinarily skilled in the art can further drive other drawings from these drawings without any inventive effort.

DETAILED DESCRIPTION

The embodiments of the invention provide a beam-forming method and apparatus, to perform beam-forming according to location information of UEs, so as to guarantee high coverage performance of a broadcast beam, and to avoid a significant loss of power arising from a too low amplitude of weight of broadcast beam-forming covering the entire coverage area of a cell.

A flexible vertical coverage area can be provided with massive MIMO, but a design of a broadcast beam is closely related to a coverage scenario, it is very difficult to select an appropriate vertical beam width and downward-inclination angle precisely. The embodiments of the invention generally address the problem in a massive MIMO scenario that the performance of a control channel may be degraded due to a significant loss of a beam-forming factor of broadcast beam covering all the locations in a coverage area, so the embodiments of the invention provide how to select an appropriate weight of beam-forming according to the location distribution of UEs so as to guarantee high coverage performance.

A flexible broadcast beam across frames is possible with massive MIMO, so in the embodiments of the invention, the location distribution of UEs can be statistically determined, and an appropriate broadcast beam-forming factor can be selected according to the characteristic of the location distribution of the UEs, so that the same weight of broadcast beam-forming can be selected for the UEs in the same location distribution, and the UEs in different 1 distributions can be distinguished in a time-division mode.

Figure 4:
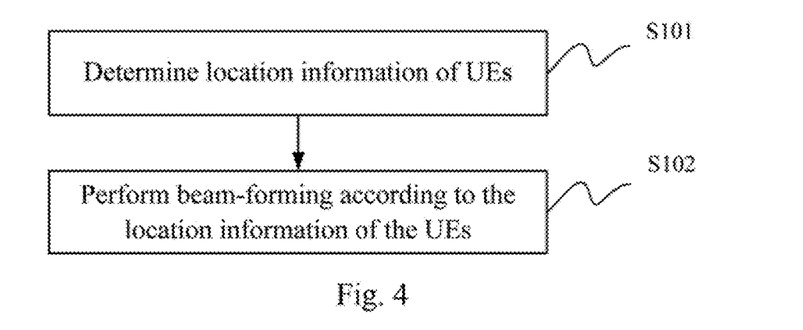
FIG. 4 is a schematic flow chart of a beam-forming method according to an embodiment of the invention.

Referring to FIG. 4, a beam-forming method according to an embodiment of the invention includes the following steps.

The step S101 is to determine location information of UEs.

The step S102 is to perform beam-forming according to the location information of the UEs.

With this method, the location information of the UEs is determined, and beam-forming is performed according to the location information of the UEs, so that high coverage performance of the broadcast beam can be guaranteed, to thereby avoid a significant loss of power arising from a too low amplitude of the weight of broadcast beam-forming covering the entire area of a cell.

Optionally before the location information of the UEs is determined, the method further includes: selecting an initial broadcast beam so that the UEs access a network using the initial broadcast beam.

Optionally determining the location information of the UEs includes: making a statistics of Angles of Arrival (AOA) in the horizontal direction and Elevations of Arrival (EOA) of the UEs according to a Sounding Reference Signal (SRS).

Optionally, for each UE, performing beam-forming according to the location information of the UE includes: determining a beam-forming factor in the horizontal direction of the broadcast beam according to the AOA of the UE; determining a beam-forming factor in the vertical direction of the broadcast beam according to the EOA of the UE; and determining a weight of broadcast beam-forming according to the beam-forming factor in the horizontal direction, and the beam-forming factor in the vertical direction.

Optionally the method further includes: clustering a plurality of UEs; and scheduling the UEs in the same cluster using the same weight of broadcast beam-forming.

Optionally the UEs in different clusters are scheduled using the same weight of broadcast beam-forming in a time-division mode at a preset periodicity.

For example, a specific flow includes the following steps.

The first step is to select an initial broadcast beam.

The base station can select an initial broadcast beam, where both the horizontal width and the vertical width of the beam are large, and for example, the horizontal width is 65 degrees, and the vertical width is 30 degrees, to thereby guarantee a large coverage range for initial accesses of the UEs.

The second step is to determine an AOA distribution in the horizontal direction, and an EOA distribution in the vertical direction of the UE(s).

Specifically after the UE accesses the network, a statistics of the AOA distribution in the horizontal direction, and the EOA distribution in the vertical direction of the accessing UE is made according to a Sounding Reference Signal (SRS) while the UE is being served. For example, the AOA distribution in the horizontal direction of the UE lies between 0 to 30 degrees, and the EOA distribution in the vertical direction of the UE lies between 30 degrees to 60 degrees.

The third step is to calculate a weight of broadcast beam-forming dynamically according to the AOA distribution and the EOA distribution of the UE.

For example, if the AOA distribution in the horizontal direction of the UE lies between 0 to 30 degrees, then the AOA of the UE may be selected as 20 degrees; and if the EOA distribution in the horizontal direction of the UE lies between 30 degrees to 60 degrees, then the EOA of the UE may be selected as 50 degrees.

After the AOA and the EOA are determined, a forming vector in the horizontal direction is calculated in the following steps.

The step a is to calculate R=H'*H from Sounding Reference Signal (SRS) information H on antennas in the horizontal direction, where R is a correlation matrix, and to perform Singular Value Decomposition (SVD) on R to obtain the largest eigenvalue vector.

The step b is to calculate an eigenvector of the AOA as $\exp\{li\cdot2\pi\cdot\sin(AOA)\cdot(d_0-d)\}$, where d is a preset spacing between adjacent antennas, $d_0$ is a preset distance between any one of the antennas and the center of all the antennas, and both d and $d_0$ are preset constants; and li in the equation represents a complex number, i.e., sqrt(−1), and the AOA in the equation is 20 degrees, for example.

The step c is to correlate the eigenvector of the AOA with the largest eigenvalue vector to obtain an index corresponding to a largest AOA. Specifically the two vectors are the mostly highly correlated with each other, and there is an eigenvector of each AOA index, where the two vectors are conjugated and multiplied with each other, and the largest product thereof is the index corresponding to the largest AOA.

The step d is to determine the forming vector in the horizontal direction from the index, where each AOA corresponds to one eigenvector, as defined in the equation above of the eigenvector of the AOA.

Alike the forming vector in the vertical direction can be determined from the EOA.

The weight of broadcast beam-forming can be determined as the Kronecker product of the forming vector in the horizontal direction, and the forming vector in the vertical direction.

For example, the directivity and the width of the broadcast beam (the values and the ranges of the AOA and the EOA) are determined according to the AOA and EOA distribution of the UE under some criterion, and vertical angles of the broadcast beam of 90% of the UEs are distributed in the angle range of 10 degrees to 20 degrees, so the direction of the main lobe of the broadcast beam can point at the central angle of the angle range, i.e., 15 degrees, and the vertical beam width of the broadcast beam is selected as 10 degrees; a corresponding weight in the vertical direction is generated accordingly, and alike a weight in the horizontal direction can be generated in the equation $\exp\{li\cdot2\pi\cdot\sin(AOA)\cdot(d_0-d)\}$ of the AOA, where firstly the vector in the vertical direction, and the vector in the horizontal direction are generated respectively in the equation of the AOA, and then the weight of broadcast beam-forming is determined as their Kronecker product.

It shall be noted that the AOA distribution in the horizontal direction, and the EOA distribution in the vertical direction of the UE are determined in the second step above so that the AOA value and the EOA value are calculated using an SRS, and specifically the eigenvector and the AOA vector are correlated, and the index of the angle when their correlation value is largest is determined.

Furthermore there are AOA in the horizontal direction, and EOA in the vertical direction of UE due to 3D-MIMO, so the distributions of the AOA in the horizontal direction, and the EOA in the vertical direction are analyzed respectively, and it is determined whether the UEs can be clustered, that is, whether the UEs lie in some range. Whether the UEs can be clustered can be determined by determining whether the AOA distribution of the UEs lies in some angle range, e.g., the range of 0 to 30 degrees, and only when the UEs can be clustered, then the UEs can be assigned to a cluster, otherwise, the UEs cannot be assigned to any cluster.

Optionally the UEs can be clustered (or grouped) under some criterion according to the AOA distributions and the EOA distributions of the UEs, and for example, the UEs with their AOAs distributed between 0 and 30 degrees are assigned to one cluster, and the UEs with their AOAs distributed between 30 degrees and 60 degrees are assigned to another cluster.

There are the same angle (AOA and EOA) distributes of the UEs in the same cluster, where there are the same AOA distribution and the same EOA distribution thereof, so corresponding weights of broadcast beam-forming are generated according to the central angles and the angle widths of angle ranges of the respective clusters (that is, the weight of broadcast beam-forming is determined as the Kronecker product as described above).

Since there are different weights of broadcast beam-forming for the UEs in different clusters, the UEs with the different weights of broadcast beam-forming can be scheduled in different sub-frames in a time-division mode. Since the UEs may perform channel estimation using preceding and succeeding downlink sub-frames, they can be scheduled in the time-division mode at a periodicity of 5 ms, for example.

Figure 5:
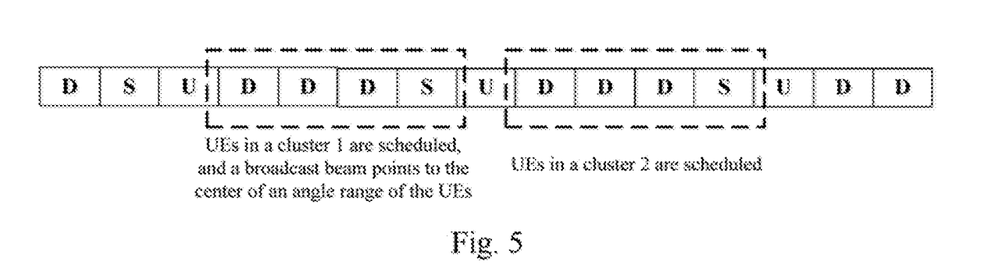
FIG. 5 is a schematic diagram of scheduling schemes of different clusters of UEs according to an embodiment of the invention.

By way of an example, a building covered with massive MIMO includes different floors with different angle distributions in different clusters, and UEs in the different clusters are scheduled at different instances of time, so that a cell can be virtually split vertically. Referring to FIG. 5, D represents a downlink sub-frame, S represents a special sub-frame, and U represents an uplink sub-frame; and UEs in a cluster 1 are scheduled in four consecutive downlink sub-frames between the first two U, and UEs in a cluster 2 are scheduled in four consecutive downlink sub-frames between another two U.

Figure 6:
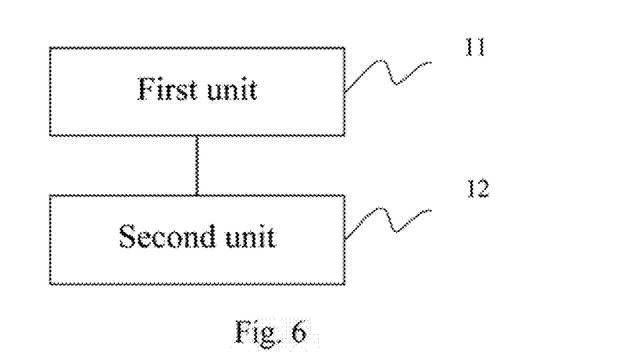
FIG. 6 is a schematic structural diagram of a beam-forming apparatus according to an embodiment of the invention.

In correspondence to the method above, referring to FIG. 6, an embodiment of the invention provides a beam-forming apparatus including the followings.

A first unit 11 is configured to determine location information of UEs.

A second unit 12 is configured to perform beam-forming according to the location information of the UEs.

Optionally the first unit is further configured to select an initial broadcast beam so that the UEs access a network using the initial broadcast beam, before the location information of the UEs is determined.

Optionally the first unit is configured: to make a statistics of Angles of Arrival (AOA) in the horizontal direction, and Elevations of Arrival (EOA) of the UEs according to a Sounding Reference Signal (SRS).

Optionally the second unit is configured: to determine beam-forming factors in the horizontal direction of the broadcast beam according to the AOA of the UEs; to determine beam-forming factors in the vertical direction of the broadcast beam according to the EOA of the UEs; and to determine weights of broadcast beam-forming according to the beam-forming factors in the horizontal direction, and the beam-forming factors in the vertical direction.

Optionally the second unit is further configured: to cluster the plurality of UEs are clustered; and to schedule the UEs in the same cluster using the same weight of broadcast beam-forming.

Optionally the second unit is configured to schedule the UEs in different clusters in a time-division mode using the same weight of broadcast beam-forming at a preset periodicity.

Either of the units above can be embodied as a processor.

The beam-forming apparatus can be a base station at the network side, for example.

Figure 7:
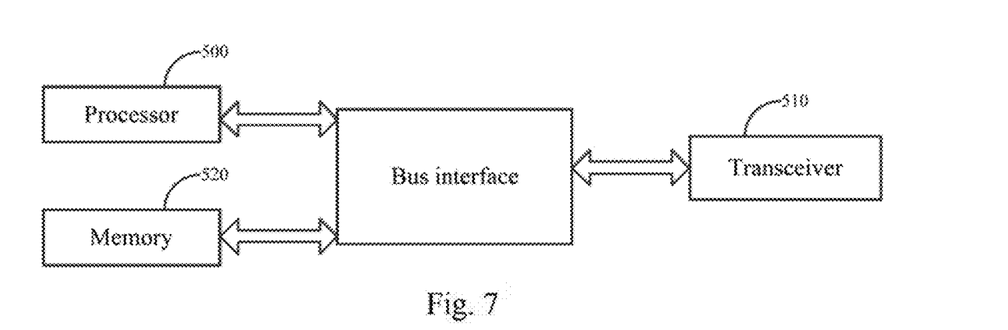
FIG. 7 is a schematic structural diagram of another beam-forming apparatus according to an embodiment of the invention.

Referring to FIG. 7, an embodiment of the invention provides another beam-forming apparatus including the followings.

A processor 500 is configured to read and execute program in a memory 502: to determine location information of UEs; and to perform beam-forming according to the location information of the UEs.

Optionally the processor 500 is further configured to select an initial broadcast beam so that the UEs access a network using the initial broadcast beam, before the location information of the UEs is determined.

Optionally the processor 500 configured to determine the location information of the UEs is configured: to make a statistics of Angles of Arrival (AOA) in the horizontal direction, and Elevations of Arrival (EOA) of the UE according to a Sounding Reference Signal (SRS).

Optionally the processor 500 configured to perform beam-forming according to the location information of the UEs is configured: to determine beam-forming factors in the horizontal direction of the broadcast beam according to the AOA of the UEs; to determine forming factors in the vertical direction of the broadcast beam according to the EOA of the UEs; and to determine weights of broadcast beam-forming according to the beam-forming factors in the horizontal direction, and the beam-forming factors in the vertical direction.

Optionally the processor 500 is further configured: to cluster the plurality of UEs; and to schedule the UEs in the same cluster using the same weight of broadcast beam-forming.

Optionally the processor 500 is configured to schedule the UEs in different clusters in a time-division mode using the same weight of broadcast beam-forming at a preset periodicity.

A transceiver 510 is configured to receive and transmit data under the control of the processor 500. Of course, the transceiver 510 in this embodiment is optional but not necessary.

Here in FIG. 7, the bus architecture can include any number of interconnecting buses and bridges to particularly link together various circuits including one or more processors represented by the processor 500, and one or more memories represented by the memory 520. The bus architecture can further link together various other circuits, e.g., a peripheral device, a manostat, a power management circuit, etc., all of which are well known in the art, so a further description thereof will be omitted in this context. The bus interface serves as an interface. The transceiver 510 can be a number of elements, e.g., a transmitter and a receiver, which are units for communication with various other devices over a transmission medium. The processor 500 is responsible for managing the bus architecture and performing normal processes, and the memory 520 can store data for use by the processor 500 in performing the operations.

The processor 500 can be a Central Processing Unit (CPU), an Application-Specific Integrated Circuit (ASIC), a Field-Programmable Gate Array (FPGA), or a Complex Programmable Logic Device (CPLD).

An embodiment of the invention provides a computer storage medium configured to store computer program instructions, to be executed by the apparatus above, including program for performing the beam-forming method above.

The computer storage medium can be any computer accessible available medium or data storage device including but not limited to a magnetic memory (e.g., a floppy disk, a hard disk, a magnetic tape, a Magnetic-Optical (MO) disk, etc.), an optical memory (e.g., a CD, a DVD, a BD, an HVD, etc.), a semiconductor memory (e.g., an ROM, an EPROM, an EEPROM, a nonvolatile memory (NAND FLASH), a Solid State Disk (SSD), etc.), etc.

In summary, in the embodiments of the invention, the beam weight is selected dynamically according to the real distribution characteristic of the UEs, so that the main lobe of the broadcast beam points to the center of the coverage area including the UEs, and the beam width can cover the majority of the UEs; and when the distributed UEs do not lie in a cluster, the different clusters of UEs can be scheduled at different instances of time in a time-division mode, so that a cell can be virtually split vertically. Furthermore in order to enable the UEs to estimate their channels using preceding and succeeding sub-frames, they can be scheduled at a periodicity of 5 ms while being spaced by an uplink sub-frame. In the embodiments of the invention, the appropriate vertical beam and downward-inclination angles (AOA, EOA) can be selected according to the location distribution of the UEs without substantially any loss of the weight of broadcast beam-forming to thereby guarantee high coverage performance, so as to avoid a significant loss of power arising from a too low amplitude of weight of broadcast beam-forming covering the entire coverage area of the cell, which would otherwise have hindered the UEs from perceiving the channels demodulated using a CRS, e.g., a PDCCH, a PCFICH, a PHICH, a PDSCH, etc., because the performance is degraded due to a significant loss of power arising from a too low amplitude of weight of a broadcast beam covering the entire coverage area of the cell. As compared with the prior art in which a uniform vector of broadcast beam-forming is selected as 30 degrees in the vertical direction, and 65 degrees in the horizontal direction without taking any location distribution of UEs into account, in the embodiments of the invention, a statistics of the location distribution of the UEs is made so that one broadcast beam is applied to the UEs lying between 0 and 30 degrees, and the other broadcast beam is applied to the UEs lying between 30 degrees and 60 degrees, and in this way, the beams are narrowed, and the energy thereof is concentrated to thereby guarantee high coverage performance of the broadcast beam, so as to avoid a significant loss of power arising from a too low amplitude of weight of broadcast beam-forming coveraging the entire coverage area of a cell.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A beam-forming method, comprising:
    selecting an initial broadcast beam so that a plurality of UEs access a network using the initial broadcast beam;
    determining location information of the plurality of UEs; and
    performing beam-forming according to the location information of the UEs,
    wherein the determining the location information of UEs comprises: making a statistics of Angles of Arrival (AOA) in the horizontal direction, and Elevations of Arrival (EOA) of the UEs according to a Sounding Reference Signal (SRS),
    wherein performing beam-forming according to the location information of the UEs comprises:
    determining beam-forming factors in the horizontal direction of the initial broadcast beam according to the AOA of the UEs;
    determining beam-forming factors in the vertical direction of the initial broadcast beam according to the EOA of the UEs; and
    determining weights of broadcast beam-forming according to the beam-forming factors in the horizontal direction, and the beam-forming factors in the vertical direction.

2. The method according to claim 1, further comprising:
    clustering the plurality of UEs; and
    scheduling the UEs in a same cluster using a same weight of broadcast beam-forming.

3. The method according to claim 2, wherein the UEs in different clusters are scheduled in a time-division mode using the same weight of broadcast beam-forming at a preset periodicity.

4. A beam-forming apparatus, comprising:
    a processor, configured to read and execute program in a memory:
    to select an initial broadcast beam so that a plurality of UEs access a network using the initial broadcast beam;
    to determine location information of the plurality of UEs; and
    to perform beam-forming according to the location information of the UEs;

wherein the processor is configured: to make a statistics of Angles of Arrival (AOA) in the horizontal direction, and Elevations of Arrival (EOA) of the UEs according to a Sound Reference Signal (SRS);

wherein the processor is configured:
- to determine beam-forming factors in the horizontal direction of the initial broadcast beam according to the AOA of the UEs;
- to determine beam-forming factors in the vertical direction of the initial broadcast beam according to the EOA of the UEs; and
- to determine weights of broadcast beam-forming according to the beam-forming factors in the horizontal direction, and the beam-forming factors in the vertical direction.

5. The apparatus according to claim 4, wherein the processor is further configured:
- to cluster the plurality of UEs; and
- to schedule the UEs in a same cluster using a same weight of broadcast beam-forming.

6. The apparatus according to claim 5, wherein the processor is configured to schedule the UEs in different clusters in a time-division mode using the same weight of broadcast beam-forming at a preset periodicity.

7. A non-transitory computer storage medium, comprising computer executable instructions configured to cause a computer to perform a beam-forming method comprising:

selecting an initial broadcast beam so that a plurality of UEs access a network using the initial broadcast beam;

determining location information of the plurality of UEs; and performing beam-forming according to the location information of the UEs, wherein the determining the location information of UEs comprises: making a statistics of Angles of Arrival (AOA) in the horizontal direction, and Elevations of Arrival (EOA) of the UEs according to a Sounding Reference Signal (SRS);

wherein performing beam-forming according to the location information of the UEs comprises:

determining beam-forming factors in the horizontal direction of the initial broadcast been according to the AOA of the UEs;

determining beam-forming factors in the vertical direction of the initial broadcast beam according to the EOA of the UEs; and determining weights of broadcast beam-forming according to the beam-forming factors in the horizontal direction, and the beam-forming factors in the vertical direction.

* * * * *